(12) United States Patent
Lu et al.

(10) Patent No.: US 8,228,611 B2
(45) Date of Patent: Jul. 24, 2012

(54) LENS MODULE

(75) Inventors: Yi-Tien Lu, Hsin-Chu (TW); Yu-Tsung Lee, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 112 days.

(21) Appl. No.: 12/940,467

(22) Filed: Nov. 5, 2010

(65) Prior Publication Data

US 2011/0176226 A1 Jul. 21, 2011

(30) Foreign Application Priority Data

Jan. 20, 2010 (TW) ................................ 99101512 A

(51) Int. Cl.
*G02B 9/00* (2006.01)
*G02B 9/60* (2006.01)

(52) U.S. Cl. ........................................ 359/649; 359/770

(58) Field of Classification Search .......... 359/649–651, 359/770

See application file for complete search history.

(56) References Cited

U.S. PATENT DOCUMENTS

| 6,075,658 | A | 6/2000 | Nagahara | |
|---|---|---|---|---|
| 7,679,832 | B1 * | 3/2010 | Wang et al. | 359/650 |
| 2007/0223102 | A1 | 9/2007 | Betensky | |

FOREIGN PATENT DOCUMENTS

| TW | M269477 | 7/2005 |
|---|---|---|
| TW | I307813 | 3/2009 |
| TW | M362997 | 8/2009 |
| TW | I315410 | 10/2009 |

* cited by examiner

*Primary Examiner* — William Choi
(74) *Attorney, Agent, or Firm* — WPAT, P. C.; Justin King

(57) ABSTRACT

A lens module has a magnified side and a reduced side having an imaging surface. The lens module includes a first, a second, and a third lens groups having positive refractive powers respectively. The first lens group includes a first and a second lenses. A value calculated by dividing a distance between a center of a surface of the first lens facing the magnified side and the imaging surface by the effective focal length of the lens module is greater than or equal to 1 and smaller than or equal to 3. The second lens group located between the first lens group and the reduced side includes a third and a fourth lenses. The third lens group located between the second lens group and the reduced side includes a fifth lens. Refractive powers of the first to the fifth lenses are negative, positive, positive, negative and positive, respectively.

11 Claims, 12 Drawing Sheets

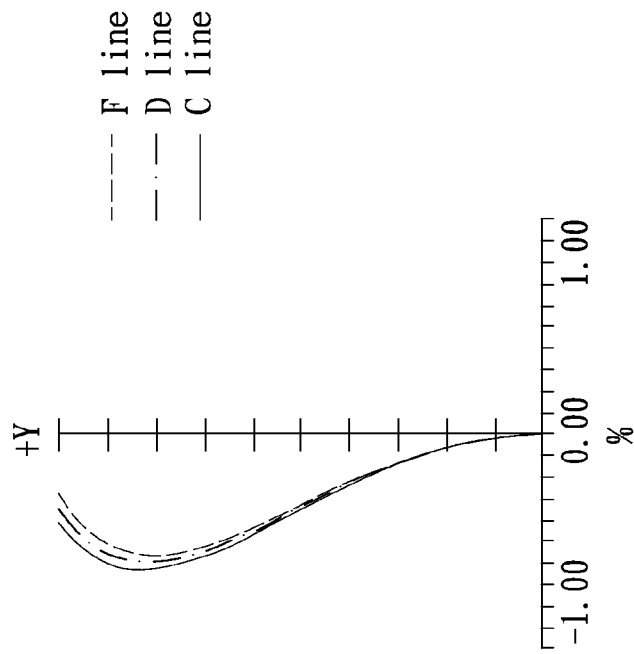
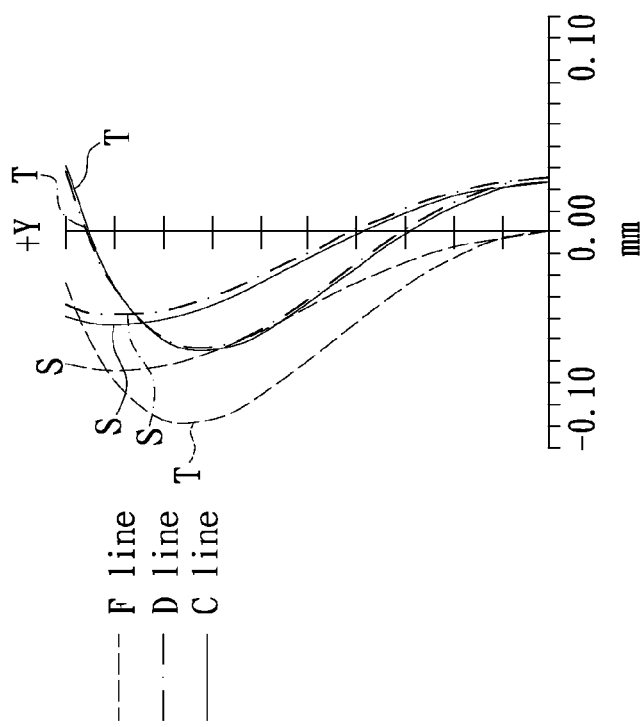

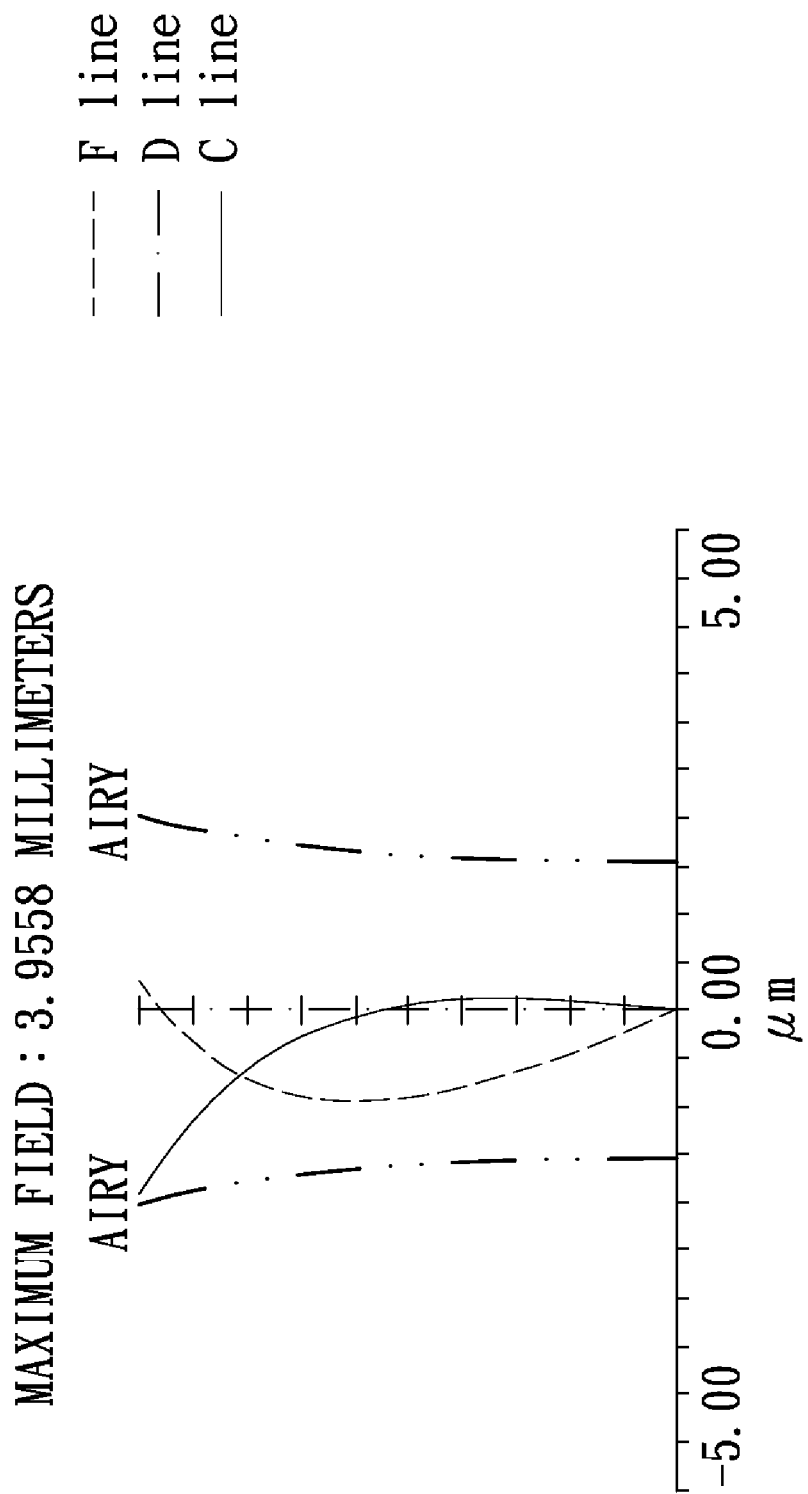

LENS MODULE

BACKGROUND

1. Field of the Invention

The invention relates to a lens module and in particular to a fixed-focus lens module.

2. Description of the Prior Art

US patent pub. No. 2007/0223102, U.S. Pat. No. 6,075, 658, and TW patent Nos. I315410, M269477, I307813, and M362997 disclose many kinds of lens modules. However, a lens module used in a projector is required to meet the requirement of high image quality so an image projected by the lens module is generally required to meet the requirements of low distortion aberration, high resolution, high contract, high uniformity and so on. Further, in order to project a large image in a short distance, the lens module is required to meet the requirement of larger field of view (FOV) and the image projected by the lens modules is required to meet the requirement of small keystone aberration. In addition, in order to increase utilization of light and uniformity of brightness of the projected image, a maximum angle between a main light at a reduced side of the lens module and an optical axis, that is telecentric angle, could be as small as possible such that the main light is almost parallel to the optical axis.

In order to design the above lens module which meets the requirements, many difficulties need to be overcome. For example, in order to reduce the distortion aberration, the FOV is reduced and the number of the lenses of the lens module is increased. In order to increase the FOV and reduce the telecentric angle, the length of the lens module is likely increased and the size of each of the lenses is likely enlarged. In the conventional art, in order to design the lens module having the effective focal length with about 10 millimeters and the image quality meeting above requirements, the number of the lenses is excess such that the space occupied by the lens module is enhanced and the production cost of the lens module is increased.

BRIEF SUMMARY

The invention provides a lens module having at least one of the following advantages: small volume, low production cost, and good image quality.

Other advantages and objects of the invention may be further comprehended through the technical features disclosed in the invention.

To achieve one of or part of or all of above objectives or other objectives, the invention provides a lens module having a magnified side and a reduced side opposite to the magnified side. The reduced side has an imaging surface. The lens module includes a first lens group, a second lens group, and a third lens group.

The first lens group has a positive refractive power and includes a first lens having a negative refractive power and a second lens having a positive refractive power. The first lens is near the magnified side. A distance between a center of a surface of the first lens facing the magnified side and the imaging surface is D. An effective focal length of the lens module is F, and $1 \leq D/F \leq 3$.

The second lens group has a positive refractive power and is located between the first lens group and the reduced side. The second lens group includes a third lens having a positive refractive power and a fourth lens having a negative refractive power. The third lens is located between the second lens and the fourth lens.

The third lens group has a positive refractive power and is located between the second lens group and the reduced side. The third lens group includes a fifth lens having a positive refractive power.

In one embodiment of the invention, the lens module further includes an aperture stop located between the first lens group and the second lens group.

In one embodiment of the invention, an interrelated focusing group is composed of the first lens group, the second lens group, and the aperture stop, and the third lens group is a stationary group.

In one embodiment of the invention, a convex surface of the second lens faces the reduced side.

In one embodiment of the invention, a convex surface of the third lens faces the magnified side, and a concave surface of the fourth lens faces the reduced side.

In one embodiment of the invention, a convex surface of the fifth lens faces the magnified side.

In one embodiment of the invention, a radius of curvature of a surface of the fourth lens facing the magnified side is R7, a radius of curvature of a concave surface of the fourth lens is R8, and $0.7 \leq (|R7|+R8)/(|R7|-R8) \leq 2$.

In one embodiment of the invention, an Abbe Number of the third lens is V3, an Abbe Number of the fourth lens is V4, and $20 \leq (V3-V4) \leq 37$.

In one embodiment of the invention, an effective focal length of the third lens group is $F_{G3}$, and $0.8 \leq F_{G3}/F \leq 2$.

In one embodiment of the invention, at least one of the first lens, the second lens, the third lens, the fourth lens, and the fifth lens is an aspherical lens.

The embodiments of the invention have at least one of the following advantages: small volume, low production cost, and good image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the embodiments of the invention, and are incorporated in and constitute part of this specification. The drawings illustrate embodiments of the invention and, together with the description, serve to explain the principles of the invention.

FIG. 6B is a graph showing the field curvature of the lens module according to the third embodiment.

FIG. 6C is a graph showing the distortion of the lens module according to the third embodiment.

FIG. 6D is a graph showing the transverse chromatic aberration of the lens module according to the third embodiment.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

First Embodiment

Figure 1:
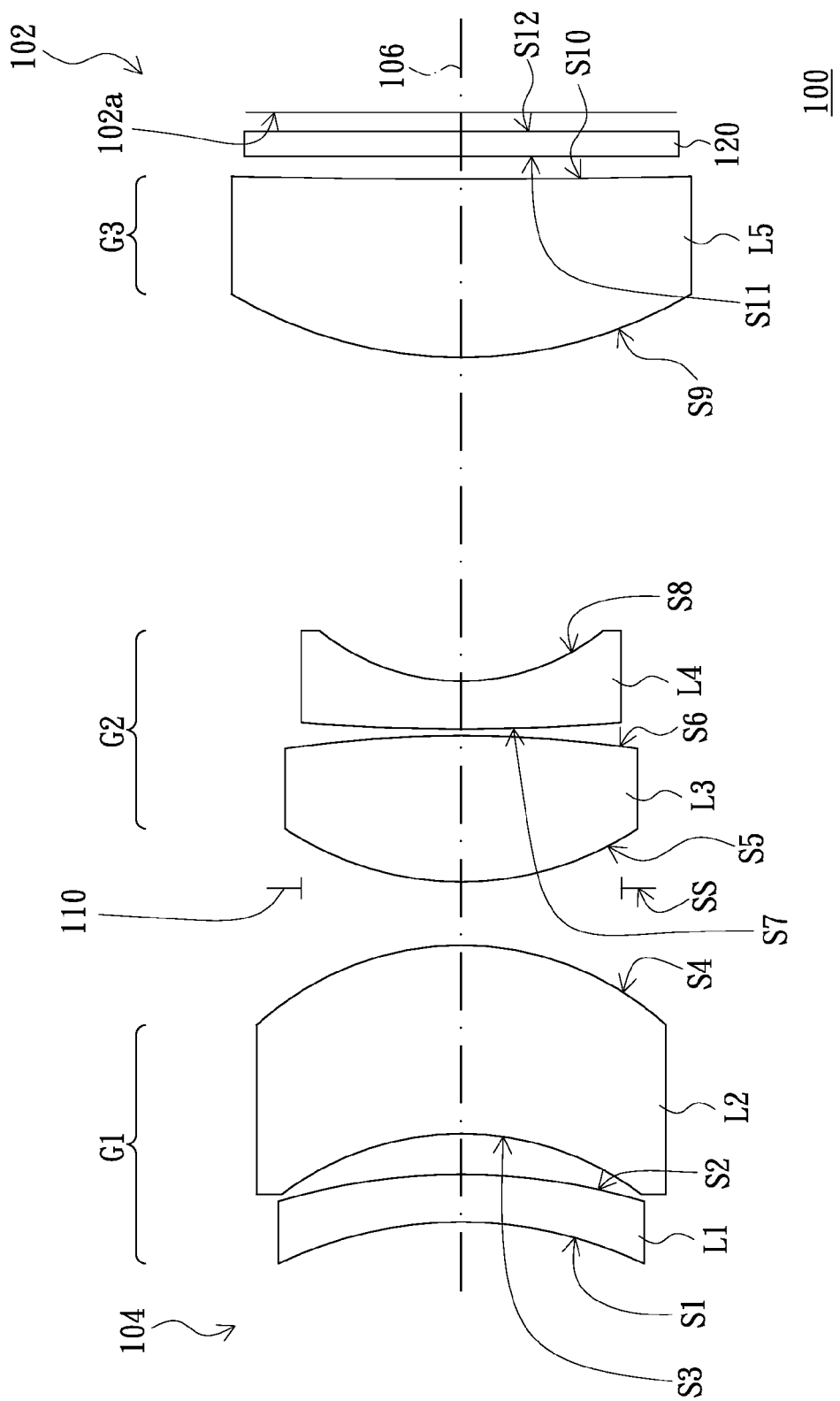
FIG. 1 is a schematic view of a lens module according to a first embodiment of the invention.

Referring to FIG. 1, a lens module 100 of the embodiment is a fixed-focus lens module and is used in a telecentric system, the invention is not limited to this. In another embodiment, the lens module 100 is used in a non-telecentric system. The lens module 100 has a reduced side 102, a magnified side 104 opposite to the reduced side 102, and an optical axis 106. The magnified side 104 is a side to which an image is projected by the lens module 100. The reduced side 102 is near a light valve (not shown), and the light valve may be a digital micromirror device (DMD). The reduced side 102 has an imaging surface 102a. An active surface of the light valve of the present embodiment is disposed on the imaging surface 102a.

The lens module 100 includes a first lens group G1, a second lens group G2, a third lens group G3, an aperture stop 110, and a protective glass 120. The first lens group G1 has a positive refractive power and includes a first lens L1 having a negative refractive power and a second lens L2 having a positive refractive power. In the embodiment, the first lens L1 and the second lens L2 are negative meniscus lenses. The first lens L1 is near the magnified side 104 and has a surfaces S1 and a surface S2 opposite to the surface S1. The surface S2 of the first lens L1 faces the reduced side 102. The second lens L2 has a surfaces S3 and a surface S4 opposite to the surface S3. The surface S4 of the second lens L2 is a convex surface and faces the reduced side 102.

The second lens group G2 has a positive refractive power and includes a third lens L3 having a positive refractive power and a fourth lens L4 having a negative refractive power. The second lens L2 and the third lens L3 are located between the first lens L1 and the fourth lens L4, and the second lens L2 is located between the first lens L1 and the third lens L3. In the present embodiment, the third lens L3 is a biconvex lens and has a surface S5 and a surface S6 opposite to the surface S5. The surface S5 and the surface S6 are two convex surfaces and face the magnified side 104 and the reduced side 102, respectively. The fourth lens L4 has a surface S7 and a surface S8 opposite to the surface S7. The surface S7 and the surface S8 face the magnified side 104 and the reduced side 102, respectively. The surface S8 is a concave surface. It is noted that types of the lenses described above cannot be limited herein. In other embodiment, the lenses may be different types.

The third lens group G3 includes a fifth lens L5 having a positive refractive power. The fifth lens L5 is near the reduced side 102 and the fourth lens L4 is between the third lens L3 and the fifth lens L5. The fifth lens L5 has a surface S9 and a surface S10 and the surface S9 is a convex surface. The surface S9 and the surface S10 face the magnified side 104 and the reduced side 102, respectively. At least one of the first lens L1, the second lens L2, the third lens L3, the fourth lens L4, and the fifth lens L5 is an aspherical lens. The function of the aspherical lens is to reduce the number of the lenses and to correct the aberration such that the size of the lens module 100 is reduced and the image quality of the lens module 100 as a whole is improved.

The aperture stop 110 is disposed between the second lens L2 and the third lens L3. An interrelated focusing group is composed of the first lens group G1, the second lens group G2, and the aperture stop 110, and the third lens group G3 is a stationary group. That is, when the lens module 100 focuses, the first lens groups G1, the second lens groups G2, and the aperture stop 110 move towards the reduced side 102 or the magnified side 104 together, and the third lens group G3 remains stationary. The protective glass 120 has a surface S11 and a surface S12 opposite to the surface S11 and is located between the fifth lens L5 and the imaging surface 102a.

In the embodiment, because at least one of the first lens L1, the second lens L2, the third lens L3, the fourth lens L4, and the fifth lens L5 is the aspherical lens, the image quality of the lens module 100 is high. In addition, because the number of the lenses in the lens module 100 could be reduced, the lens module 100 could be miniaturized and the production cost could be lowered. Therefore, the lens module 100 could be applied to miniaturized portable electronic devices (e.g., mobile phones).

In order to avoid a length of the lens module 100 being too long or too short, the lens module 100 meets the correlation (1): $1 \leq D/F \leq 3$. The D represents a distance between a center of the surface S1 (that is, the concave surface S1) of the first lens L1 facing the magnified side 104 and the imaging surface 102a. The F represents an effective focal length of the lens module 100. If the value of D/F is less than 1, a distance between the second lens group G2 and the third lens group G3 is relatively short and thus, there is not enough space for another element such as a reflective mirror to be disposed between the second lens group G2 and the third lens G3. If the value of D/F is more than 1, the image quality of the lens module 100 is better but the length of the lens module 100 is too long to meet the requirement of miniaturization.

It should be noted that, in the embodiment, the first lens L1 of the first lens group G1 near the magnified side 104 has a negative refractive power, so the FOV of an image projected by the lens module 100 could be increased. Furthermore, the surface S1 of the first lens L1 of the present embodiment is a concave surface and faces the magnified side 104, so the size of the first lens L1 could be reduced. In addition, the third lens L3 of the second lens group G2 may be designed to have a larger refractive power to correct the aberration generated by the first lens group G1. However, if the third lens L3 is designed to have a larger positive refractive power and when an off-axis light enters into the third lens L3, due to the positive refractive power of the third lens L3 being larger, the larger the incident angle of the off-axis light becomes, the more manifest the coma becomes. In order to reduce the coma, the third lens L3 may be designed to be an aspherical lens, or the conditions that the incident angle of the off-axis light is reduced and the surface S3 of the second lens L2 facing the magnified side 104 is designed to be an aspherical surface so that the second lens L2 at the edge of the surface S3 has a larger negative refractive power or a smaller positive refractive power so as to reduce the incident angle of the off-axis light incident to the third lens L3. The above methods may be selectively combined.

It is noted that the fourth lens L4 having the negative refractive power could correct off-axis aberration and residual aberration of the first lens L1, the second lens L2, and the third lens L3. Furthermore, the surface S4 of the second lens L2 of the first lens group G1 is a convex surface and faces the reduced side 102, and the surface S5 of the third lens L3 of the second lens group G2 is a convex surface and faces the magnified side 104 so that the second lens L2 and the third lens L3 could be disposed as closely as possible. The aperture stop 110 is located between the first lens group G1 and the second lens group G2 such that the length of the lens module 100 as a whole is reduced and the lens module 100 is miniaturized. In addition, the surface S8 of the fourth lens L4 of the second lens group G2 is a concave surface and faces the reduced side 102 such that the size of the fourth lens L4 could become smaller and the distance between the fourth lens L4 and the fifth lens L5 could become larger so as to place another element such as a reflective mirror between the fourth lens L4 and the fifth lens L5.

In order to improve the image quality of the lens module 100, the lens module 100 may meet one of the following correlations (2) to (4). The correlations (2) to (4) are: $0.7 \leq (|R7|+R8)/(|R7|-R8) \leq 2$, $20 \leq (V3-V4) \leq 37$ and $0.8 \leq F_{G3}/F \leq 2$, respectively. The R7 represents a radius of curvature of the surface S7 of the fourth lens L4 facing the magnified side 104. The R8 represents a radius of curvature of the surface S8 of the fourth lens L4 facing the reduced side 102. The V3 represents an Abbe Number of the third lens L3. The V4 represents an Abbe Number of the fourth lens L4. The F represents the effective focal length of the lens module 100. The $F_{G3}$ represents the effective focal length of the third lens group G3.

If the lens module 100 meets the correlation (2), the off-axis aberration of the lens module 100 may be corrected more, especially the field curvature and coma. If the value of $(|R7|+R8)/(|R7|-R8)$ is greater than 2, the aberration at the surface S8 of the third lens L4 facing the reduced side 102 appears more manifest and the off-axis aberration could not be easily corrected, especially the field curvature. If the value of $(|R7|+R8)/(|R7|-R8)$ is less than 0.7, the negative refractive power of the fourth lens L4 is small and the aberration thereof could not be easily corrected.

If the value of (V3−V4) is less than 20, the transverse chromatic aberration of the lens module 100 could not be easily corrected. If the value of (V3−V4) is greater than 37, the longitudinal chromatic aberration of the lens module 100 could not be easily corrected.

If the lens module 100 meets the correlation (4), the lens module 100 is applicable to a telecentric system. If the value of $F_{G3}/F$ is greater than 2, the refractive power of the third lens group G3 is smaller. In such situation, the size of the fourth lens L4 is designed to be larger such that the lens module 100 could be used in a telecentric system. However, the fourth lens L4 having the larger size may cause the space occupied by the lens module 100 to be larger and may not meet the miniaturization requirement. If the value of $F_{G3}/F$ is less than 0.8, the refractive power of the third lens group G3 is larger such that the distance between the second lens G2 and the third lens groups G3 is shorter. Accordingly, there is not enough space for another element such as a reflective mirror to be disposed between the second lens group G2 and the third lens G3.

An example is given to show the lens module 100 of the first embodiment in the following. It is noted that the data in the following Tables cannot limit the invention and could be varied according to a predetermined requirement.

In the first embodiment, the second lens L2 and the fourth lens L4 are aspherical lenses. The lens module 100 is constructed according to Tables 1 and 2 as follows.

TABLE 1

| Surface | Radius of Curvature (mm) | Separation (mm) | Refractive Power | Abbe Number | Remark |
|---|---|---|---|---|---|
| S1 | −7.13926 | 0.8 | 1.666816 | 31.37883 | first lens L1 |
| S2 | −10.5939 | 0.548844 | | | |
| S3 | −4.75711 | 3.19823 | 1.67679 | 57.83832 | second lens L2 |
| S4 | −4.23989 | 1 | | | |
| SS | Infinity | 0.1 | | | aperture stop 110 |
| S5 | 5.393974 | 2.502047 | 1.617965 | 62.60566 | third lens L3 |
| S6 | −18.559 | 0.1 | | | |
| S7 | 16.98693 | 0.8 | 1.68916 | 30.48596 | fourth lens L4 |
| S8 | 3.146381 | 7.379251 | | | |
| S9 | 7.498392 | 3.045746 | 1.514562 | 72.30905 | fifth lens L5 |
| S10 | 95.87982 | 0.390549 | | | |

TABLE 1-continued

| Surface | Radius of Curvature (mm) | Separation (mm) | Refractive Power | Abbe Number | Remark |
|---|---|---|---|---|---|
| S11 | Infinity | 0.4 | 1.508469 | 61.1878 | protective glass 120 |
| S12 | Infinity | 0.306 | | | |

In the first embodiment, the effective focal length of the lens module 100 is about 9.929 mm, the FOV of the lens module 100 is about 40.85 degrees and the telecentric angle of the lens module 100 is about 3 degrees. Furthermore, (|R7|+R8)/(|R7|−R8)=1.455, V3−V4=32.12, D/F=2.072 and $F_{G3}/F$=1.566. It is noted that the radius of curvature of any surface in Table 1 represents the radius of curvature of the surface near the optical axis 106. In addition, the separation corresponding to any surface in Table 1 represents a distance from the surface to the next surface in the direction towards the reduced side 102 along the optical axis 106. For example, the separation (e.g. 0.8 mm) corresponding to the surface S1 (e.g. the concave surface S1) represents a distance between the surface S1 and the surface S2 (e.g. the convex surface S2) along the optical axis 106. The separation (e.g. 0.1 mm) corresponding to the surface SS represents a distance between the surface SS and the surface S5 (e.g. the convex surface S5) along the optical axis 106. The separation (e.g. 0.306 mm) corresponding to the surface S12 represents a distance between the surface S12 and the imaging surface 102a along the optical axis 106.

TABLE 2

| | surface S3 | surface S4 | surface S7 | surface S8 |
|---|---|---|---|---|
| k | 0 | 0 | 0 | 0 |
| C2 | 0 | 0 | 0 | 0 |
| C4 | 1.0078E−03 | 2.6085E−03 | −8.1796E−04 | −5.9068E−03 |
| C6 | 7.9502E−05 | −3.7372E−05 | −4.4981E−04 | −5.2819E−04 |
| C8 | −1.5496E−05 | 9.5410E−06 | 9.3352E−05 | 1.2660E−04 |
| C10 | 1.6867E−06 | −6.1046E−07 | −1.0180E−05 | −1.8805E−05 |
| C12 | −5.4521E−08 | 3.1154E−08 | 4.4544E−07 | 7.6003E−07 |

In the first embodiment, the surface S3 (e.g. the concave surface S3), the surface S4 (e.g. the convex surface S4), the surface S7, the surface S8 (e.g. the concave surface S8) of the lens module 100 are aspherical surfaces and the shapes thereof meet the following correlation:

$$Z(h) = \frac{h^2/r}{1 + \sqrt{1-(1+k)(h^2/r^2)}} + C_2h^2 + C_4h^4 + C_6h^6 + C_8h^8 + C_{10}h^{10} + C_{12}h^{12} + \ldots$$

In the above correlation, the Z(h) represents a sag along the optical axis 106, and the r represents a radius of osculating sphere, i.e., a radius of curvature near the optical axis 106. The k represents a conic constant, and the h represents an aspherical height, i.e., a height from the central of a lens to the edge of the lens. The C2, C4, C6, C8, C10, C12 . . . are aspherical coefficients. For example, to calculate a sag of the surface S3, the value of the corresponding conic constant corresponding to the surface S3 in Table 2, the values of the aspherical coefficients corresponding to the surface S3 in Table 2 and the value of the radius of curvature corresponding to the surface S3, i.e. −4.75711 mm, in Table 1 substitute into the above correlation.

Figure 2A:
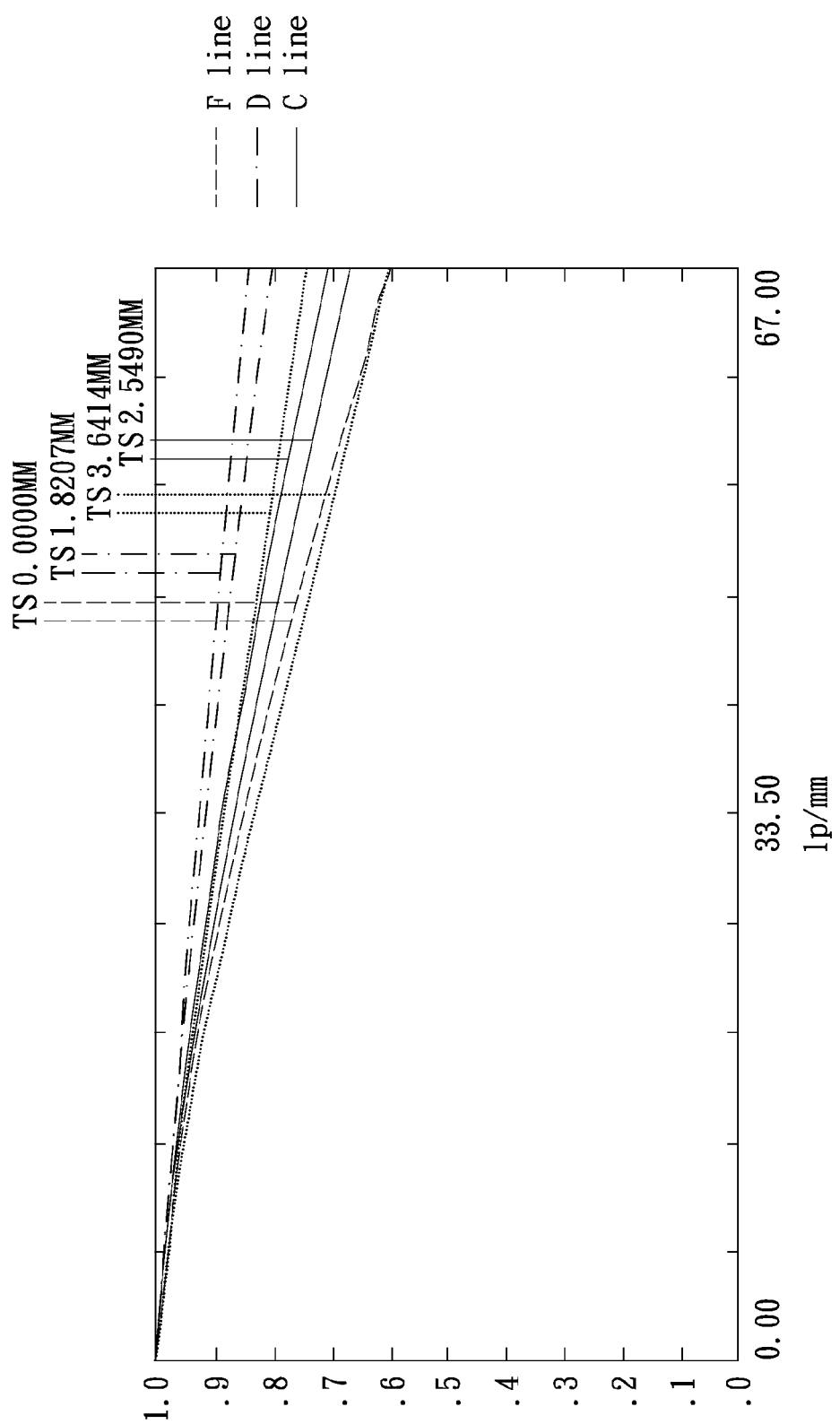
FIG. 2A is a graph showing the modulation transfer function (MTF) of the lens module according to the first embodiment.
Figure 2C:
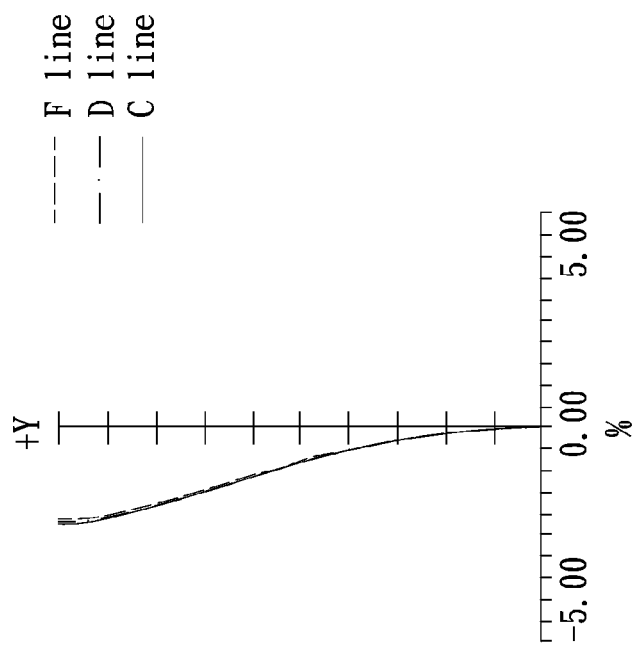
FIG. 2C is a graph showing the distortion of the lens module according to the first embodiment.
Figure 2B:
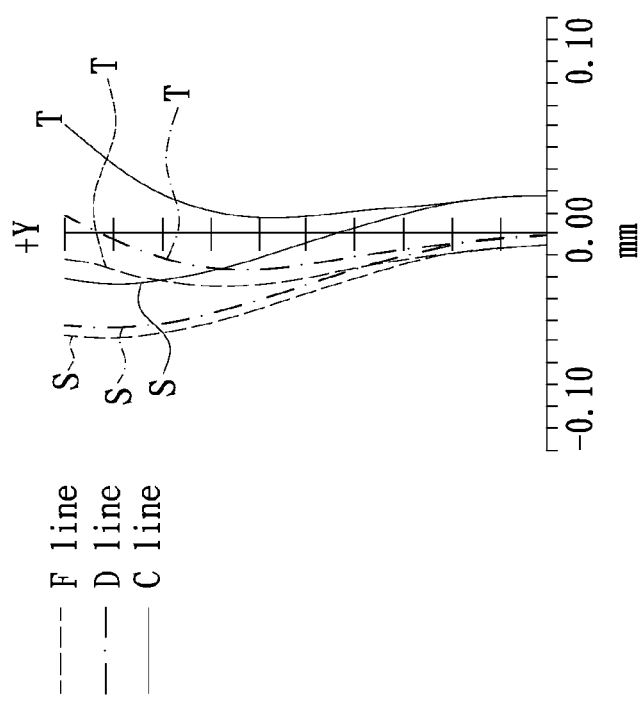
FIG. 2B is a graph showing the field curvature of the lens module according to the first embodiment.
Figure 2D:
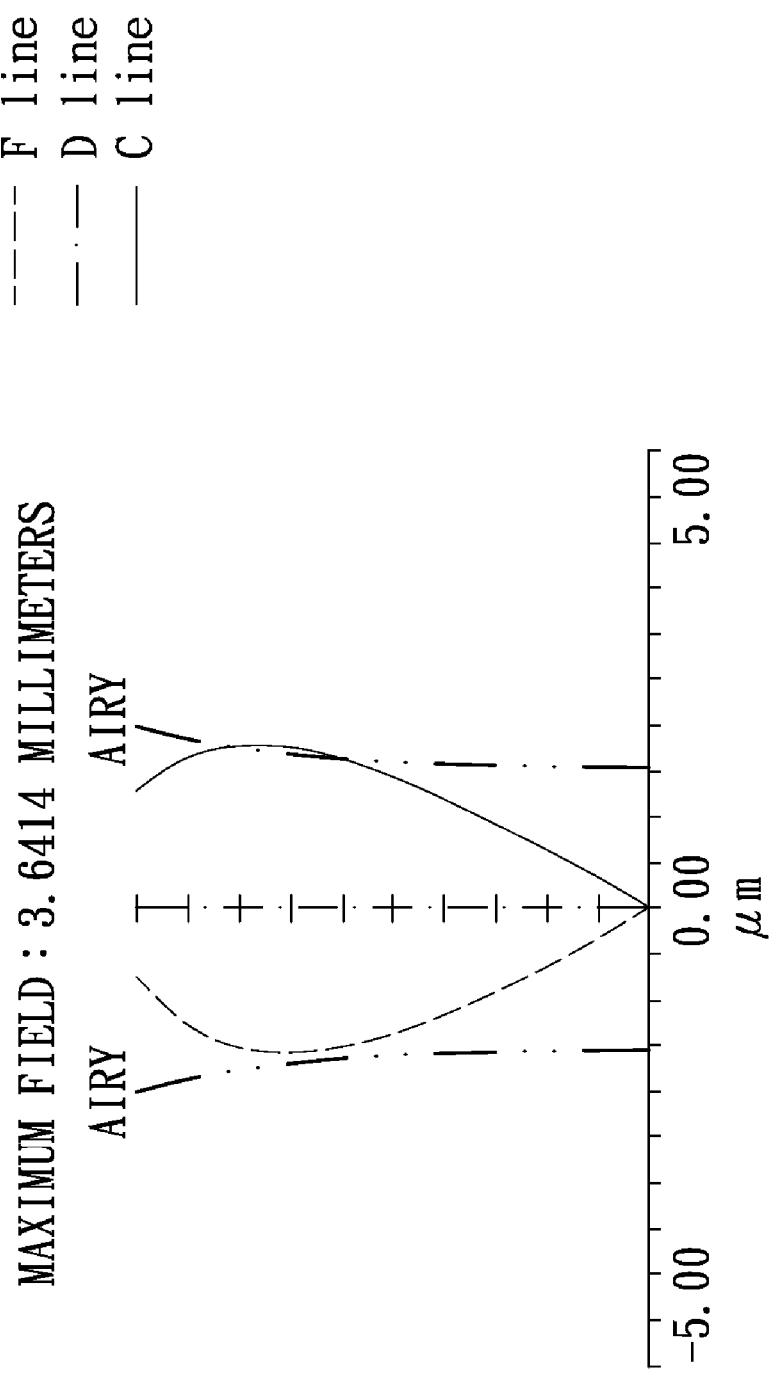
FIG. 2D is a graph showing the transverse chromatic aberration of the lens module according to the first embodiment.

The horizontal axis of FIG. 2A represents spatial frequency in cycles per millimeter and the vertical axis of FIG. 2A represents the modulus of optical transfer function (OTF). In FIG. 2A and FIG. 2B, S represents a meridional direction of the lens module 100 and T represents a sagittal direction of the lens module 100. In FIG. 2A to FIG. 2D, the F line represents a testing light used by the blue light having wave length of 486 nanometers, the D line represents a testing light used by the green light having wave length of 587 nanometers, and the C line represents a testing light used by the red light having wave length of 656 nanometers. Because the data shown in FIG. 2A to FIG. 2D fall in standard ranges, the lens module 100 of the first embodiment is certified to have small telecentric angle to be applicable to a telecentric system. Besides, under the premise of the image quality of the lens module 100 being good, the production cost of the lens module 100 is reduced and the miniaturization requirement on the lens module 100 is achieved.

Second Embodiment

Figure 3:
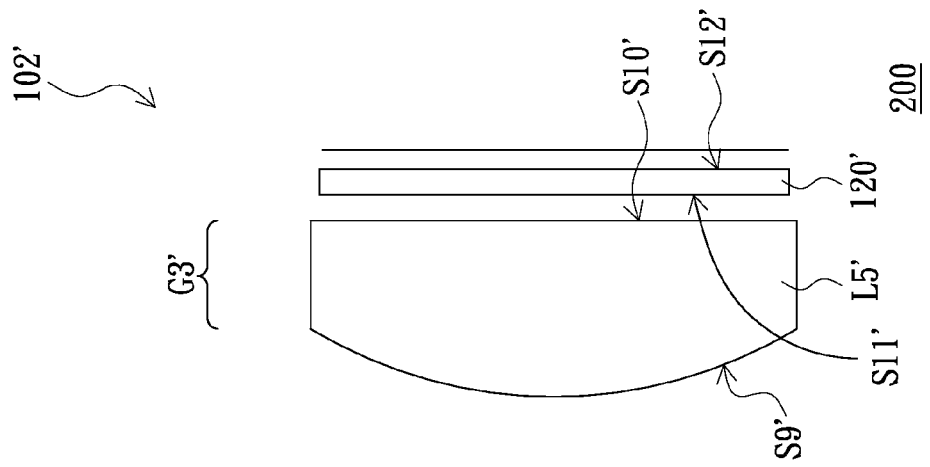
FIG. 3 is a schematic view of a lens module according to a second embodiment of the invention.
Figure 3:
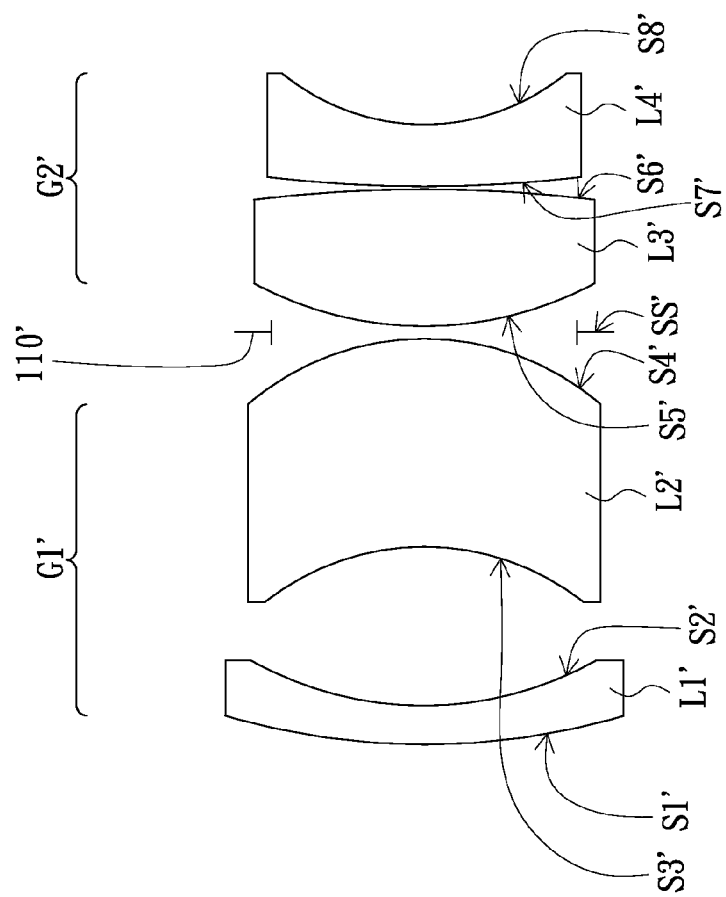
Figure 4A:
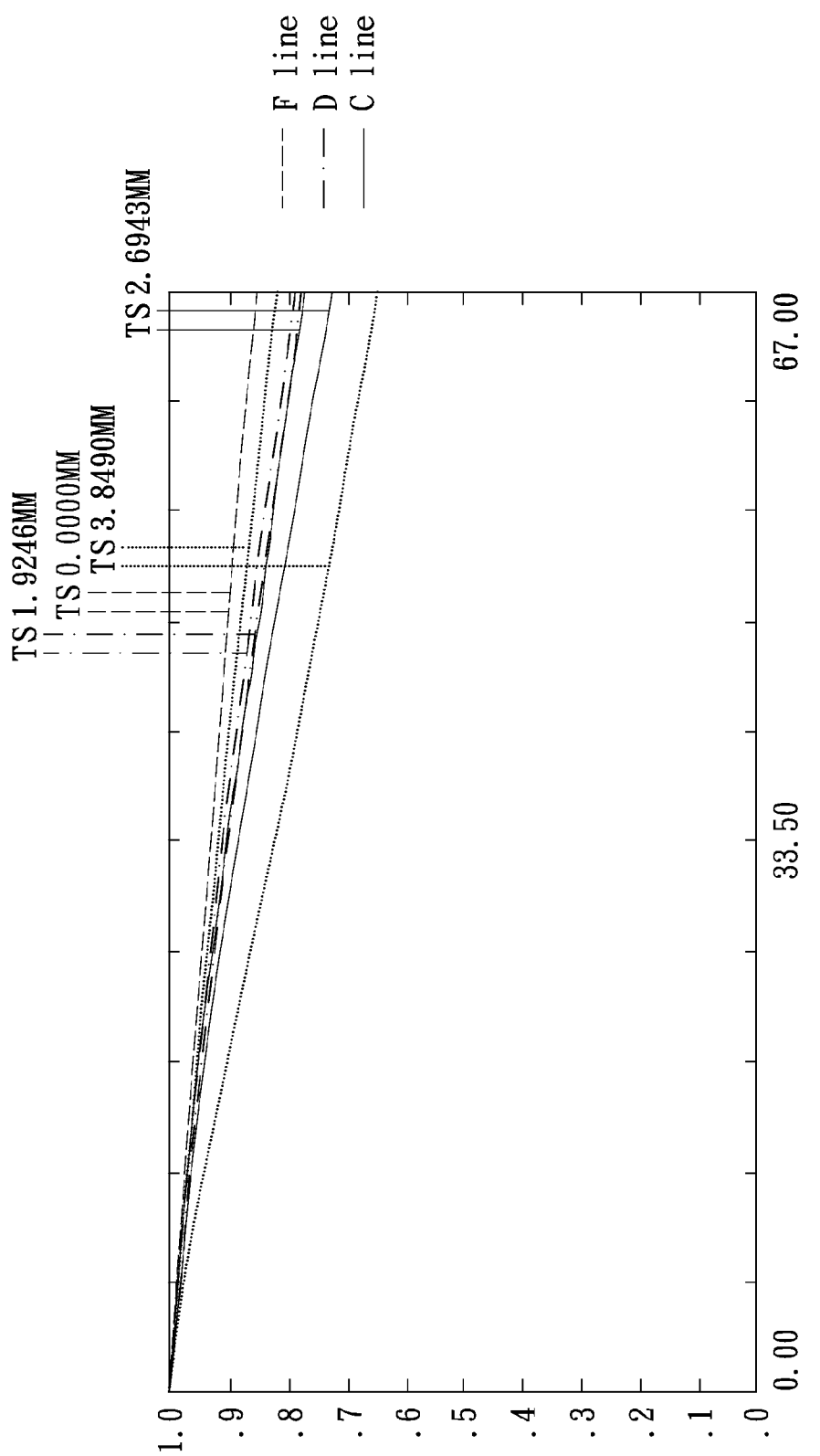
FIG. 4A is a graph showing the modulation transfer function of the lens module according to the second embodiment.
Figure 4C:
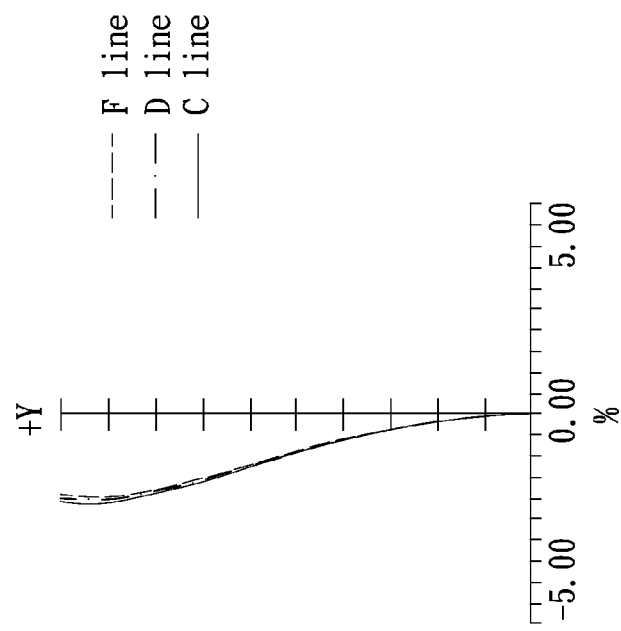
FIG. 4C is a graph showing the distortion of the lens module according to the second embodiment.
Figure 4B:
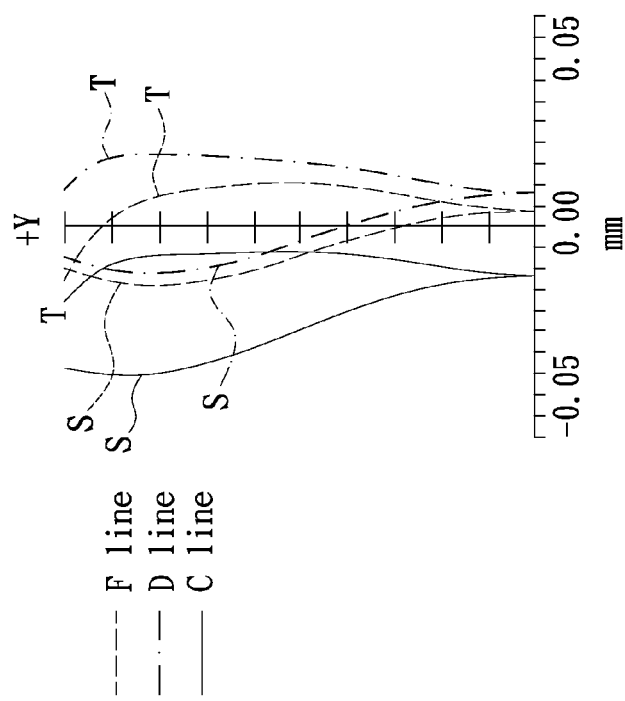
FIG. 4B is a graph showing the field curvature of the lens module according to the second embodiment.
Figure 4D:
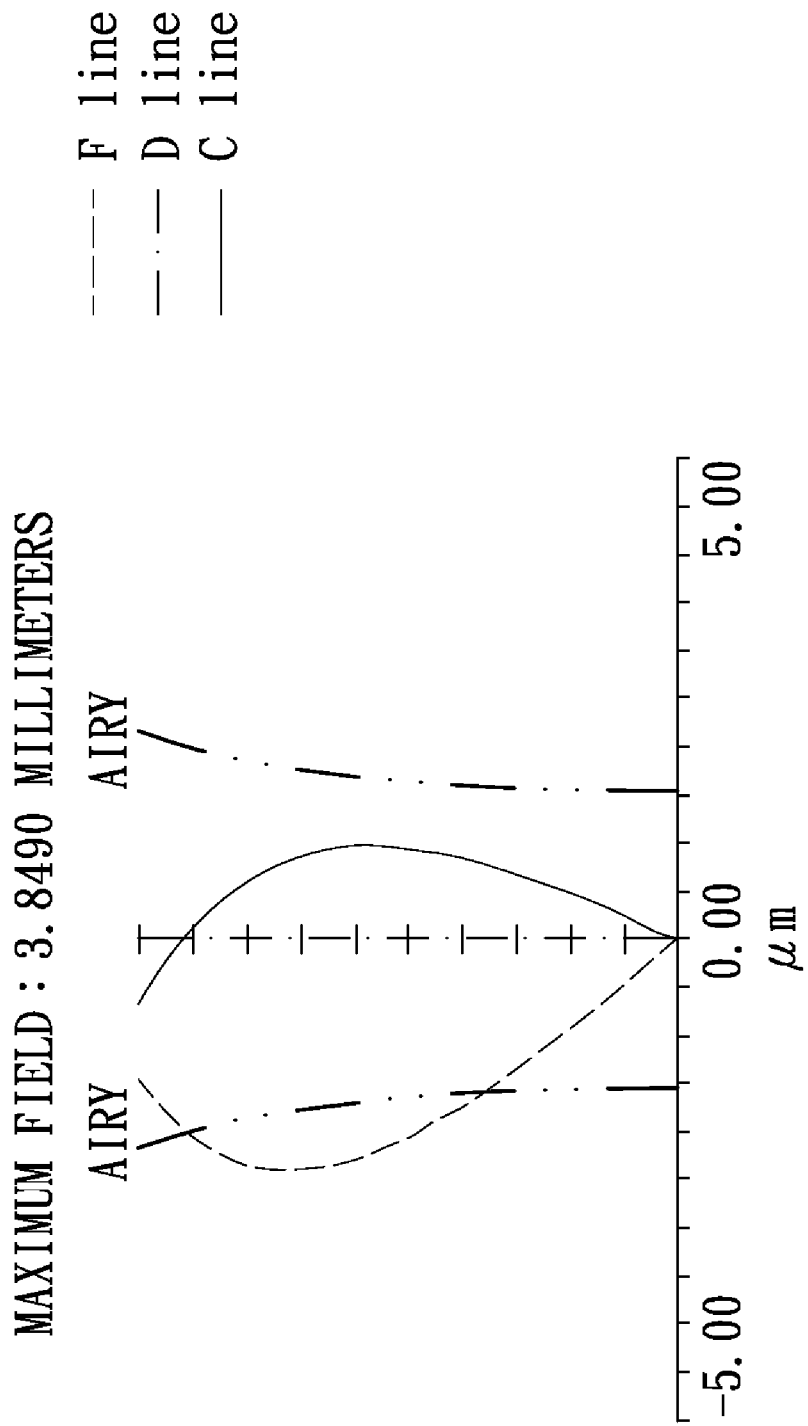
FIG. 4D is a graph showing the transverse chromatic aberration of the lens module according to the second embodiment.

Referring to FIG. 3 and FIG. 1, the lens module 200 of the embodiment is similar to the lens module 100 of the first embodiment. The lens module 200 includes a first lens group G1', a second lens group G2', and a third lens group G3' having positive refractive powers respectively and meets the correlation (1). An example of the lens module 200 is provided in the following. It is noted that the data in the following Tables could not limit the invention and may be varied according to a predetermined requirement.

In the second embodiment, the first lens L1', the second lens L2', the fourth lens L4', and the fifth lens L5' are aspherical lenses. The lens module 200 is constructed according to Tables 3 and 4 as follows.

TABLE 3

| Surface | Radius of Curvature (mm) | Separation (mm) | Refractive Index | Abbe Number | Remark |
|---|---|---|---|---|---|
| S1' | 9.296193 | 0.7 | 1.53116 | 56.04383 | first lens L1' |
| S2' | 5.649228 | 2.588363 | | | |
| S3' | −4.46544 | 3.489375 | 1.53116 | 56.04383 | second lens L2' |
| S4' | −3.8525 | 0.1 | | | |
| SS' | Infinity | 0.1 | | | aperture stop 110' |
| S5' | 5.951511 | 2.258944 | 1.772454 | 50.74945 | third lens L3' |
| S6' | −28.4526 | 0.1 | | | |
| S7' | 28.37077 | 0.989484 | 1.631919 | 23.41612 | fourth lens L4' |
| S8' | 3.223802 | 6.997602 | | | |

TABLE 3-continued

| Surface | Radius of Curvature (mm) | Separation (mm) | Refractive Index | Abbe Number | Remark |
|---|---|---|---|---|---|
| S9' | 7.756468 | 2.910413 | 1.53116 | 56.04383 | fifth lens L5' |
| S10' | −240.875 | 0.430301 | | | |
| S11' | Infinity | 0.4 | 1.508469 | 61.1878 | protective glass 120' |
| S12' | Infinity | 0.306 | | | |

In the second embodiment, the effective focal length of the lens module 200 is about 8.888 mm, the FOV of the lens module 200 is about 47.50 degrees, and the telecentric angle of the lens module 200 is about 3.2 degrees. Furthermore, $(|R7|+R8)/(|R7|−R8)=1.256$, $V3−V4=27.333$, $D/F=2.404$ and $F_{G3}/F=1.588$. It is noted that the separation corresponding to any surface in Table 3 represents a distance from the surface to the next surface in the direction towards the reduced side 102' along the optical axis 106'. The description in detail may be referred to the related paragraph in the first embodiment.

TABLE 4

| | surface S1' | surface S2' | surface S3' | surface S4' | surface S7' | surface S8' | surface S9' |
|---|---|---|---|---|---|---|---|
| K | 0 | 0 | 0 | 0 | 0 | 0 | 0 |
| C2 | 0 | 0 | 0 | 0 | 0 | 0 | 0 |
| C4 | −2.9189E−03 | −3.7671E−03 | −1.0876E−03 | 3.1777E−03 | 8.5359E−04 | −4.8296E−03 | −1.7855E−04 |
| C6 | 2.3684E−04 | 3.1460E−04 | 1.2826E−04 | −5.5366E−05 | −2.8994E−04 | 3.5864E−06 | 0 |
| C8 | −2.7969E−06 | 4.6075E−06 | −1.2169E−06 | 1.8156E−05 | 3.7125E−05 | 6.5949E−06 | 0 |
| C10 | −2.4992E−07 | −1.1296E−06 | 2.9461E−07 | −1.4191E−06 | −3.5106E−06 | −3.7150E−06 | 0 |
| C12 | 5.6704E−09 | 7.9349E−08 | −2.0421E−08 | 8.4107E−08 | 1.3944E−07 | 4.4690E−08 | 0 |

Because the data shown in FIG. 4A to FIG. 4D fall in standard ranges, the lens module 200 of the second embodiment is certified to have small telecentric angle to be applicable to a telecentric system. Besides, under the premise of the image quality of the lens module 200 being good, the production cost of the lens module 200 is reduced and the miniaturization requirement on the lens module 200 is achieved.

Third Embodiment

Figure 5:
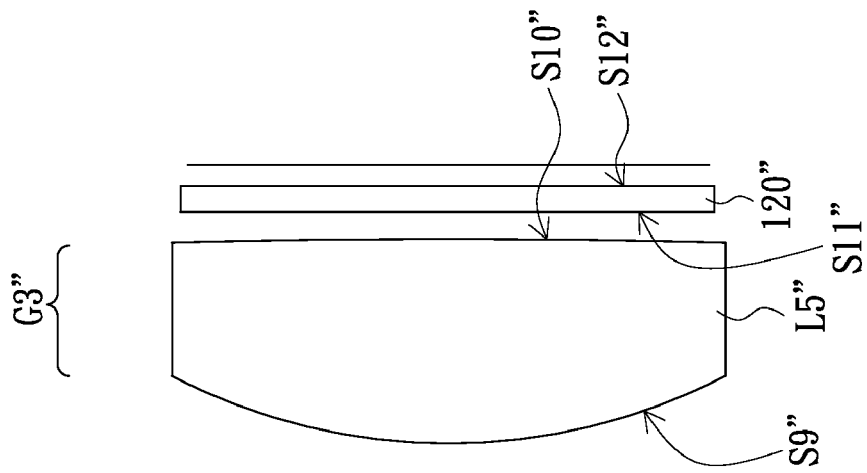
FIG. 5 is a schematic view of a lens module according to a third embodiment of the invention.
Figure 5:
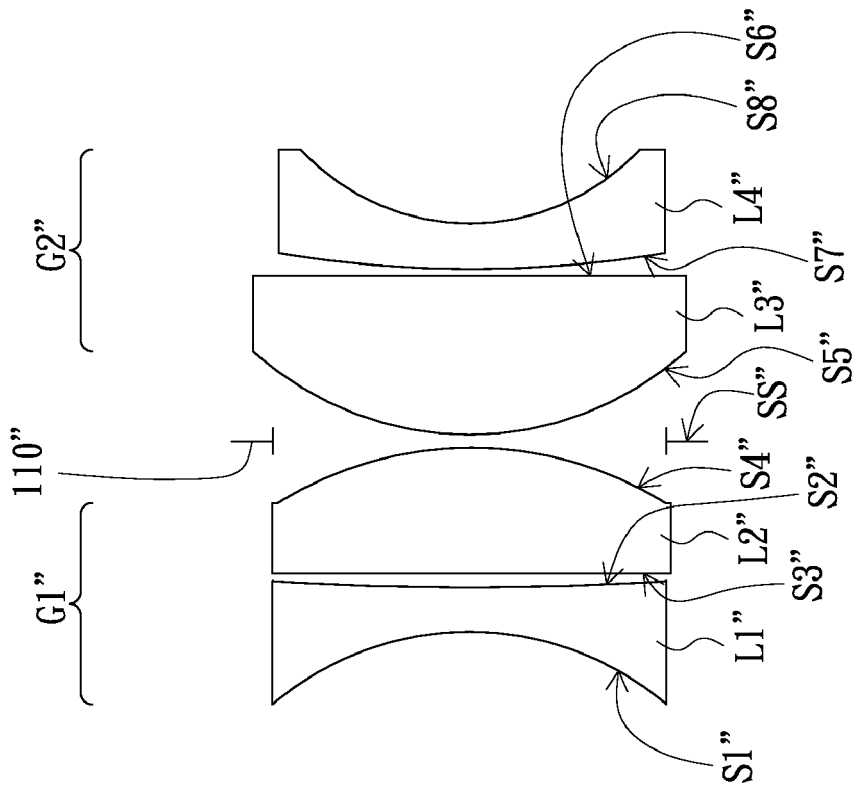
Figure 6A:
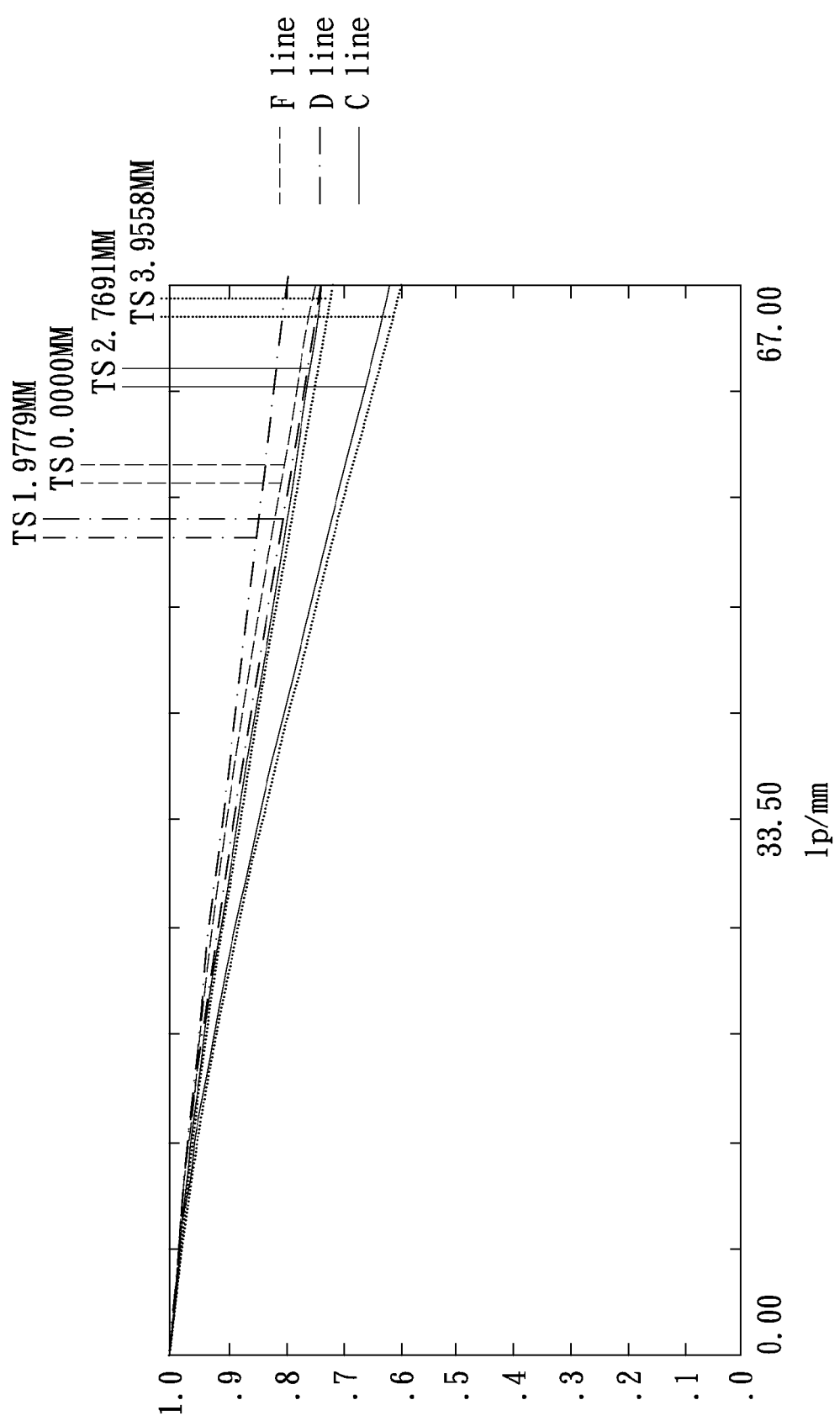
FIG. 6A is a graph showing the modulation transfer function of the lens module according to the third embodiment.

Referring to FIG. 5 and FIG. 1, the lens module 300 of the present embodiment is similar to the lens module 100 of the third embodiment. The lens module 300 includes a first lens group G1", a second lens group G2", and a third lens group G3" having positive refractive powers respectively and meets the correlation (1). An example of the lens module 300 is provided in the following. It is noted that the data in the following Tables could not limit the invention and could be varied according to a predetermined requirement.

In the third embodiment, the first lens L1", the second lens L2", and the fourth lens L4" are aspherical lenses. The lens module 300 is constructed according to Tables 5 and 6 as follows.

TABLE 5

| Surface | Radius of Curvature (mm) | Separation (mm) | Refractive Index | Abbe Number | Remark |
|---|---|---|---|---|---|
| S1" | −4.47584 | 0.7 | 1.53116 | 56.04383 | first lens L1" |
| S2" | 11.48618 | 0.21994 | | | |
| S3" | 172.902 | 1.763714 | 1.53116 | 56.04383 | second lens L2" |
| S4" | −4.02188 | 0.1 | | | |
| SS" | Infinity | 0.1 | | | aperture stop 110" |
| S5" | 4.909292 | 2.324839 | 1.772739 | 48.86895 | third lens L3" |
| S6" | 171.7792 | 0.1 | | | |
| S7" | 12.27271 | 0.7 | 1.631919 | 23.41612 | fourth lens L4" |
| S8" | 3.090737 | 8.207207 | | | |
| S9" | 7.527813 | 2.814779 | 1.53116 | 56.04383 | fifth lens L5" |
| S10" | −83.3237 | 0.69248 | | | |
| S11" | Infinity | 0.4 | 1.508469 | 61.1878 | protective glass 120" |
| S12" | Infinity | 0.306 | | | |

In the third embodiment, the effective focal length of the lens module 300 is about 10.695 mm, the FOV of the lens module 300 is about 40.53 degrees, and the telecentric angle of the lens module 300 is about 3.16 degrees. Furthermore, $(|R7|+R8)/(R7-R8)=1.673$, $V3-V4=25.453$, $D/F=1.723$ and $F_{G3}/F=1.221$.

TABLE 6

|  | surface S1" | surface S2" | surface S3" | surface S4" | surface S7" | surface S8" |
|---|---|---|---|---|---|---|
| k | 0 | 0 | 0 | 0 | 0 | 0 |
| C2 | 0 | 0 | 0 | 0 | 0 | 0 |
| C4 | −6.9618E−04 | −5.1393E−03 | −1.1108E−03 | 4.5497E−03 | 2.6914E−03 | −3.2639E−03 |
| C6 | 2.4326E−04 | 6.2863E−05 | 1.3185E−04 | 1.0414E−04 | −6.9995E−04 | −2.2009E−04 |
| C8 | 5.7052E−06 | 1.4176E−05 | −1.1728E−06 | 2.4897E−05 | 2.4785E−05 | −7.3391E−05 |
| C10 | 4.9465E−07 | 4.3113E−07 | 3.9660E−07 | −2.7072E−06 | 3.0860E−07 | 1.1160E−05 |
| C12 | −5.9924E−08 | −1.6988E−08 | −5.4129E−08 | 5.7832E−08 | −1.1648E−08 | −8.3395E−07 |

Because the data shown in FIG. 6A to FIG. 6D fall in standard ranges, the lens module 300 of the third embodiment is certified to have small telecentric angle to be applicable to a telecentric system. Besides, under the premise of the image quality of the lens module 300 being good, the production cost of the lens module 300 is reduced and the miniaturization requirement on the lens module 300 is achieved.

In summary, the lens modules according to the embodiments have at least one of following and other advantages. The lens modules according to the embodiments could effectively correct transverse chromatic aberration by employing fewer lenses and realizes low distortion aberration, low keystone aberration, large FOV, and small telecentric angle (smaller or equal to 3.2 degrees). Therefore, the lens modules according to the embodiments have at least one of advantages of miniaturization, low production cost, and good image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A lens module having a magnified side and a reduced side opposite to the magnified side, the reduced side having an imaging surface, the lens module comprising:

a first lens group, having a positive refractive power and comprising a first lens having a negative refractive power and a second lens having a positive refractive power, wherein the first lens is near the magnified side, a distance between a center of a surface of the first lens facing the magnified side and the imaging surface is D, an effective focal length of the lens module is F, and $1 \leq D/F \leq 3$;

a second lens group having a positive refractive power and located between the first lens group and the reduced side, wherein the second lens group comprises a third lens having a positive refractive power and a fourth lens having a negative refractive power and the third lens is located between the second lens and the fourth lens; and a third lens group having a positive refractive power and located between the second lens group and the reduced side, wherein the third lens group comprises a fifth lens having a positive refractive power.

2. The lens module as claimed in claim 1, wherein the lens module further comprises an aperture stop located between the first lens group and the second lens group.

3. The lens module as claimed in claim 2, wherein an interrelated focusing group is composed of the first lens group, the second lens group, and the aperture stop and the third lens group is a stationary group.

4. The lens module as claimed in claim 1, wherein a convex surface of the second lens faces the reduced side.

5. The lens module as claimed in claim 1, wherein a convex surface of the third lens module faces the magnified side.

6. The lens module as claimed in claim 1, wherein a concave surface of the fourth lens faces the reduced side.

7. The lens module as claimed in claim 1, wherein a convex surface of the fifth lens faces the magnified side.

8. The lens module as claimed in claim 1, wherein a radius of curvature of a surface of the fourth lens facing the magnified side is R7, a radius of curvature of a concave surface of the fourth lens is R8, and $0.7 \leq (|R7|+R8)/(|R7|-R8) \leq 2$.

9. The lens module as claimed in claim 1, wherein an Abbe Number of the third lens is V3, an Abbe Number of the fourth lens is V4, and $20 \leq (V3-V4) \leq 37$.

10. The lens module as claimed in claim 1, wherein an effective focal length of the third lens group is $F_{G3}$ and $0.8 \leq F_{G3}/F \leq 2$.

11. The lens module as claimed in claim 1, wherein at least one of the first lens, the second lens, the third lens, the fourth lens, and the fifth lens is an aspherical lens.

* * * * *